United States Patent
Schretling et al.

(10) Patent No.: US 10,662,931 B2
(45) Date of Patent: May 26, 2020

(54) DIAPHRAGM CELL FOR DAMPING PRESSURE PULSATIONS IN A LOW-PRESSURE REGION OF A PISTON PUMP

(71) Applicant: Robert Bosch GmbH, Stuttgart (DE)

(72) Inventors: Viktor Schretling, Markgroeningen (DE); Tobias Schenk, Marbach am Neckar (DE)

(73) Assignee: Robert Bosch GmbH, Stuttgart (DE)

(*) Notice: Subject to any disclaimer, the term of this patent is extended or adjusted under 35 U.S.C. 154(b) by 242 days.

(21) Appl. No.: 15/756,447

(22) PCT Filed: Aug. 10, 2016

(86) PCT No.: PCT/EP2016/069010
§ 371 (c)(1),
(2) Date: Feb. 28, 2018

(87) PCT Pub. No.: WO2017/059988
PCT Pub. Date: Apr. 13, 2017

(65) Prior Publication Data
US 2018/0274525 A1 Sep. 27, 2018

(30) Foreign Application Priority Data
Oct. 8, 2015 (DE) .......................... 10 2015 219 537

(51) Int. Cl.
*F04B 11/00* (2006.01)
*F04B 39/00* (2006.01)
*F16F 9/04* (2006.01)

(52) U.S. Cl.
CPC .......... *F04B 11/0016* (2013.01); *F04B 11/00* (2013.01); *F04B 11/0008* (2013.01);
(Continued)

(58) Field of Classification Search
CPC ..... F04B 11/00; F04B 11/008; F04B 11/0016; F04B 39/0061; F04B 43/02; F04B 43/023;
(Continued)

(56) References Cited

U.S. PATENT DOCUMENTS 8,393,881 B2* 3/2013 Usui ...................... F02M 55/04
417/540
8,672,653 B2* 3/2014 Mancini ................. F02M 55/04
123/447
(Continued)

FOREIGN PATENT DOCUMENTS

CN 102312809 A 1/2012
CN 103597199 A 2/2014
(Continued)

OTHER PUBLICATIONS

International Search Report corresponding to PCT Application No. PCT/EP2016/069010, dated Oct. 28, 2016 (German and English language document) (7 pages).

Primary Examiner — Patrick Hamo
Assistant Examiner — Joseph S. Herrmann
(74) Attorney, Agent, or Firm — Maginot, Moore & Beck LLP

(57) ABSTRACT

A diaphragm cell for damping pressure pulsations in a low-pressure region of a piston pump has two axially deformable diaphragms that are connected along their radial peripheries and enclose a gas space. The diaphragms each have a central region that extends over no less than 50% of the cross-sectional surface area of the diaphragms. The diaphragms are of undulating shape in the central region, which is curved axially outwards in its radially inner region and in its radially outer region. The diaphragms further include an axially inwardly curved annular region that is arranged between and immediately adjacent to the radially inner region and the radially outer region. An axially-measured amplitude of the wave shape has a predetermined range related to the cross-sectional surface area of the diaphragms when the pressure difference is zero. The pressure difference is a pressure in the gas space minus a pressure outside the gas space.

16 Claims, 5 Drawing Sheets

(52) U.S. Cl.
CPC ......... *F04B 39/0061* (2013.01); *F16F 9/0418* (2013.01); *F16F 2222/126* (2013.01); *F16F 2224/0208* (2013.01); *F16F 2226/04* (2013.01); *F16F 2228/001* (2013.01)

(58) Field of Classification Search
CPC .... F04B 43/025–028; F04B 45/04–045; F16F 9/0418; F16F 2222/126; F16F 2224/0208; F16F 2226/04; F16F 2228/001
See application file for complete search history.

(56) References Cited

U.S. PATENT DOCUMENTS

| | | | | |
|---|---|---|---|---|
| 8,727,752 | B2* | 5/2014 | Lucas | F04B 1/0404 |
| | | | | 417/395 |
| 9,074,593 | B2* | 7/2015 | Kobayashi | F04B 11/0008 |
| 2012/0087817 | A1 | 4/2012 | Lucas | |

FOREIGN PATENT DOCUMENTS

| | | |
|---|---|---|
| CN | 104279094 A | 1/2015 |
| DE | 103 27 408 A1 | 4/2004 |
| DE | 10 2009 000 357 A1 | 7/2009 |
| DE | 10 2010 027 773 A1 | 10/2011 |
| DE | 10 2004 002 489 B4 | 1/2013 |
| DE | 10 2014 219 997 A1 | 4/2016 |
| EP | 1 411 236 A2 | 4/2004 |
| EP | 2 317 119 A1 | 5/2011 |
| EP | 2 410 167 A1 | 1/2012 |
| WO | 2012/095718 A2 | 7/2012 |

* cited by examiner (E-E)

$p_i > p_a$

DIAPHRAGM CELL FOR DAMPING PRESSURE PULSATIONS IN A LOW-PRESSURE REGION OF A PISTON PUMP

This application is a 35 U.S.C. § 371 National Stage Application of PCT/EP2016/069010, filed on Aug. 10, 2016, which claims the benefit of priority to Serial No. DE 10 2015 219 537.6, filed on Oct. 8, 2015 in Germany, the disclosures of which are incorporated herein by reference in their entirety.

BACKGROUND

The disclosure relates to a diaphragm cell for damping pressure pulsations in a low-pressure region of a piston fuel pump, wherein the diaphragm cell has two diaphragms which are welded tightly to one another at their radial edges, wherein the two diaphragms enclose a gas space, and wherein the two diaphragms are both axially deformable.

Such diaphragm cells are known, for example, from EP 1 411 236 A2, EP 2317 119 A1, EP 2 410 167 A1, WO2012/095718 A2 and DE 10 2004 002 489 B4, and also from the subsequently published DE 10 2014 219 997 A1 by the applicant.

SUMMARY

The diaphragm cell according to the disclosure is distinguished by the fact that the diaphragms have a region which is central in the radial extent and in which the diaphragms are shaped in the manner according to the disclosure if the pressure difference which is a pressure in the gas space minus a pressure outside the gas space, in particular a pressure in the low-pressure region of the piston pump, is zero, that is to say there is a pressure equalization between the interior of the diaphragm cell and the exterior of the diaphragm cell.

The pressure difference is therefore in other words the pressure difference which acts directly on the diaphragms.

The diaphragm cell according to the disclosure improves the diaphragm cells known from the prior art in terms of their effectiveness both in damping strongly pressure fluctuations which occur as a result of a high degree of resilience in the region of functionally relevant pressure differences and in being able to tolerate high remaining pressure differences of both signs without material fatigue over their service life.

The disclosure is initially based on the fundamental realization that the overall resulting forces which act on the diaphragm cell are minimized if the pressure in the gas space is at least approximately equal to a pressure prevailing in the low-pressure region of the piston pump. Filling the gas space of the diaphragm cell in a way which takes into account this and the provided conditions of use of the diaphragm cell (temperature and pressure in the low-pressure region of the piston pump) is in this respect advantageous for high robustness and a long service life of the diaphragm cell. In other words, it has been recognized as being favorable to configure a diaphragm cell or to operate a piston pump in such a way that when a diaphragm cell is arranged in the low-pressure region of the piston pump a pressure difference which acts on the diaphragm cell is on average zero.

Moreover it has been recognized that a diaphragm cell has a maximum resilience, that is to say a maximum change in volume of the gas volume per change in the acting external pressure, in a region in which the diaphragm cell is curved inward and/or curved outward only to at the most a very small degree.

Although in this respect diaphragms which have a relatively flat profile in their central region and extend in a plane-parallel fashion with respect to one another, at least to a certain degree of approximation, have been recognized as being fundamentally favorable, in tests by the applicant on diaphragm cells whose diaphragms were provided extending entirely in a flat fashion in their central region in a pressure-equalized state, it has occasionally been possible to observe metastable states of the diaphragms in dynamic applications, and associated with this folding-over processes have occurred between convex and concave deformations of the diaphragms which gave rise to unacceptable loading of the diaphragm cells. This can be understood to be, in an extremely illustrative fashion, the occurrence of the "snap-action effect" and can be attributed to fabrication variations.

On the basis of the ideas and observations above, on the one hand the subject matter of the disclosure was developed as an overall optimized diaphragm cell, the diaphragms of which deviate, in the inventive manner, from an entirely flat configuration in a central region which has a minimum size.

A region of a diaphragm which is shaped in an undulating fashion is understood within the scope of the application as basically meaning, in particular, that the diaphragm is not flat in this region but instead is curved outward or curved inward to differing extents in the axial direction in this region along the cross-sectional area of the diaphragm.

The term region which is shaped in an undulating fashion of a diaphragm can also require, in particular, that in this region the diaphragm has a curved shape which has, in particular, at least approximately spatial periodicity, in particular in the radial direction.

In one development, the region which is shaped in an undulating fashion can merely have very flat undulations, with the result that a surface perpendicular line on the diaphragm in this region encloses with the axial direction an angle which is always not greater than 12°, in particular even not greater than 8°.

For diaphragm cells with cylindrical symmetry, in particular circumferential beads which are shaped so as to be round can be present in the region which is shaped in an undulating fashion.

The terms "curved outward" and "curved inward" specify within the scope of this application in particular the orientation of the local curvature of the diaphragms, in particular with respect to the consideration of the diaphragms in a sectional plane which is parallel to the axial direction, in diaphragms with cylindrical symmetry in a sectional plane in which the axis of symmetry is located. This occurs with respect to the gas space which is enclosed by the diaphragm cell. Convexity corresponds, in particular, to outward curving and concavity corresponds, in particular, to inward curving.

The term amplitude of the wave shape in the central region specifies within the scope of this application, in particular, the half of the maximum distance occurring between a point of the radially inner region and a point of the annular region measured in the axial direction.

The term wave shape can be understood in the development in this respect to mean that it additionally requires that there is a point of the annular region and a point of the radially outer region the distance between which, when measured in the axial direction, is equal to or greater than the amplitude of the wave shape. This clearly means, in particular, that a wave shape necessarily has a radially inner wave trough and a radially outer wave trough which is at least half as high as the inner wave trough. Even more clearly this means, in particular, that a wave shape according to the disclosure comprises one full wave length of a wave train.

If, as a comparison size for section lengths within the scope of this application, reference is made to the cross-sectional area of the diaphragms, in particular the cross-sectional area in the axial top view of the diaphragms is meant. The root of the cross-sectional area is the mathematical square root of the cross-sectional area. In diaphragm cells with cylindrical symmetry, the diaphragms are circular and the root of 4/pi times the cross-sectional area of the diaphragms is given by the diameter of the diaphragms.

In addition, the further subject matter of a method for operating a piston pump occurs, for example in a fuel system for an internal combustion engine, in the low-pressure region of which a diaphragm cell according to the disclosure is arranged, wherein a pressure in the low-pressure region is selected, for example by providing a corresponding booster pump, to be equal to the pressure in the gas space of the diaphragm cell. This pressure can lie for example in a range from 4 bar to 7 bar at 20° C. or at 40° C. or at a temperature between 20° C. and 40° C.

Unless stated expressly otherwise, in the present document references to the shape of the diaphragm cell are to be understood as meaning that the diaphragm cell has this shape when, and in particular only when, the pressure difference is zero. According to the resilience of the diaphragm cell, said cell curves outward to a greater extent in the case of a positive pressure difference and curves inward to a greater extent in the case of a negative pressure difference.

The terms for the pressure difference "zero", "positive" and "negative" are not to be interpreted, in particular, in a mathematically strict way but rather in the range thereof, which occurs during normal fabrication variation for the respective features. Therefore, a pressure difference of zero according to the disclosure can also be present if a low underpressure or overpressure is present between the gas space and the surroundings, for example at maximum 0.25 bar and/or at maximum 5% of the pressure in the gas space. The features which are defined by means of positive or negative pressure differences are, in particular, also to be interpreted more widely by virtue of the fact that corresponding inaccuracies are also permitted.

Alternatively, in particular a very narrow interpretation of the term pressure difference of zero according to the disclosure, which does not permit pressure differences of more than 1 mbar, is also considered.

The shape of a diaphragm is meant within the scope of this application to be, in particular, the shape of the surface of the diaphragm which points outward, with respect to the volume which is enclosed by the diaphragm cell.

The diaphragms are advantageously to be fabricated in a particularly simple way, for example on the basis of in each case one planar sheet-metal shaped part per diaphragm by means of a single deep-drawing step.

The diaphragms and/or the central region and/or the inner region of the central region in an axial top view advantageously have a round, in particular circular, shape, with the result that their handling is easy and their stability is high. Additionally or alternatively, the outer region of the central region and/or the further annular region have, in an axial top view, a round, in particular circular, outer contour.

The entire diaphragm cell is preferably symmetrical with respect to an axis of symmetry. However, shapes which deviate from a round shape are basically also possible. The information about diameters and radii then relates, within the scope of this application, to diameters and radii of round shapes with the same area. The axial direction occurs in this case as a perpendicular to the plane in which the edges of the diaphragms lie or, if the edges of the diaphragms do not lie in a plane, as a perpendicular to the plane from which the edges of the diaphragms deviate the least on average. The axial direction can, in particular, also be given by an axis of symmetry of a pump piston in a piston pump or by the direction of movement thereof.

The diameters of the diaphragms and of the diaphragm cell are preferably in a range of 30-50 mm. The maximum axial extent of the diaphragm cell is preferably between 2 and 6 mm. It is preferred that the diaphragms have a wall thickness in the range from 0.1 mm to 0.4 mm, and are composed of a stainless steel, for example a spring steel, for example a chromium-nickel steel, for example of the 1.4310 type. It is preferred that as a result a dependence of the axial extent of the diaphragm cell in the central region, preferably along a central axis, on the pressure difference lies in the range of diminishing pressure difference in the range from 0.2 to 0.6 mm/bar. It is preferred that a dependence of the gas volume which is enclosed by the diaphragm cell on the pressure difference lies in the range of diminishing pressure difference in the range from 200 to 400 mm$^3$/bar.

With respect to a piston pump in the low-pressure region of which the diaphragm cell is arranged, there is, in particular, provision that a resilience of the diaphragm cell lies in the range of diminishing pressure difference in the range from 15% to 50%, in particular in the range from 20% to 30%, of the volume of the piston pump, which is the maximum which can be fed by the stroke of the piston, per bar of pressure difference.

It is preferred that the dependence of the gas volume which is enclosed by the diaphragm cell on the pressure difference in an interval between the pressure differences of at least bar, for example in the interval of the pressure difference from −1.5 bar to +1.5 bar, is always at least 60% of the maximum resilience of the diaphragm cell, for example in this interval is therefore always at least 150 mm$^3$/bar, if the maximum resilience of the diaphragm cell is 250 mm$^3$/bar.

The inventive shaping of the central region is highly significant here. The effectiveness of the the disclosure is provided to a particular extent if the central region has a cross-sectional area which is not less than 55% or even not less than 60% of the cross-sectional area of at least one of the diaphragms. For circular diaphragm cells this corresponds to central regions with diameters which are not less than 74% or 77% of the diameters of the diaphragm cells.

According to the disclosure there is provision that an amplitude of the wave shape, measured in the axial direction is at least 1/1000 and at most 2/100 of the root of 4/pi times the cross-sectional area of the diaphragms. In a development of the disclosure, 2/1000, 5/1000 and 1/100 of the root of 4/pi times the cross-sectional area of the diaphragms can also be provided as a lower limit for the amplitude. In addition, 1/100, 12/1000 or 17/1000 of the root of 4/pi times the cross-sectional area of the diaphragms can also be provided as an upper limit for the amplitude.

One development of the disclosure delimits the radial distance between the radially inner region and the radially outer region of the central region more closely, and corresponds to the technical effect that the regions provided according to the disclosure are extended over a relatively large region of the diaphragms, with the result that the advantageous effects of the disclosure are realized to a particular extent. It is therefore possible to provide that the distance measured in the radial direction between the maximum curvature in the radially inner region and the maximum curvature in the radially outer region is at least 20%, in particular even at least 30%, of the root of 4/pi times the cross-sectional area of the diaphragms.

Another development of the disclosure provides that the radially inner region is curved further outward in the axial direction than the radially outer region. In this way, the advantageous effects of the disclosure could be realized to a particular extent, in particular metastable states and the occurrence of the "snap-action effect" could be particularly reliably avoided.

One development of the disclosure allows for the requirement that when the diaphragms or the diaphragm cell are/is manufactured visual inspection should be possible in a simple way, which inspection reliably detects, for example, the occurrence of fractures in the diaphragms. For this, there is, in particular, provision that a perpendicular line with respect to the surface of at least one of the diaphragms encloses everywhere an angle of not more than 60° with an axial direction, and the diaphragm cell therefore does not extend anywhere with an excessive incline in a top view. This ensures that a visual inspection whose fixed optical axis coincides with the axial direction is readily possible. A further improvement in this sense can be achieved if the perpendicular line with respect to the surface of at least one of the diaphragms encloses everywhere an angle of not more than 45° with an axial direction.

As a result of the geometric shaping of the diaphragm cell according to the disclosure, a comparatively large gas volume is available, wherein the diaphragm cell only takes up a comparatively small installation space, for example in a low-pressure region of a piston pump. This is expressed quantitatively in that the volume of the gas space when standardized to the volume of the smallest cylinder, in particular the smallest straight circular cylinder which the diaphragm cell can completely accommodate, is not less than 0.4 in the case of a diminishing pressure difference.

The following subject matters or measures are also suitable, when viewed alone and/or in combination with one another and/or with the subject matters presented in the exemplary embodiments and/or the claims, for implementing the advantages according to the disclosure to a particular extent:

Diaphragm cell in which a curvature of at least one of the diaphragms at at least one location in the central region is less than ten times the root of 4/pi times the cross-sectional area of the diaphragm or of the diameter of the diaphragm and/or at the diaphragms thereof in the case of at least one diaphragm in the central region, a deviation of the actual shape of the diaphragm from any ideally plane-parallel shape occurs which, at at least one location, is more than 0.2 mm or 5/1000 of 4/pi times the cross-sectional area of the diaphragm.

Diaphragm cell whose diaphragm is composed of sheet metal, the thickness of which is in the range from 50% to 150%, in particular from 80% to 120%, of the amplitude of the wave shape in the central region and whose thickness corresponds to the amplitude of the wave shape in the central region.

Piston pump in which the diaphragm cell is secured by two securing parts only radially inward of a welded connection which has been made at the edges of the diaphragms.

Piston pump in which a radially inner region of the central region is shaped in a convex fashion not only in the case of a pressure difference of zero, but rather also in the case of pressure differences from at least −0.5 bar to +0.5 bar, in particular even also in the case of pressure differences from at least −1 bar to +1 bar.

Piston pump in which the piston is embodied as a stepped piston and bounds an equalization space, with the result that the volume of the equalization space becomes smaller in a suction phase of the piston pump and larger in a delivery phase of the pump, wherein the equalization space is fluidically connected to the low-pressure region of the piston pump, in particular in such a way that the equalization space is connected via a borehole extending in the axial direction through a housing of the piston pump to a fluid space which is formed in a housing cover of the piston pump, wherein the diaphragm cell is arranged in the fluid space.

BRIEF DESCRIPTION OF THE DRAWINGS

Examples of the present disclosure will be explained in more detail below with reference to the appended drawings, in which.

DETAILED DESCRIPTION

Figure 1:
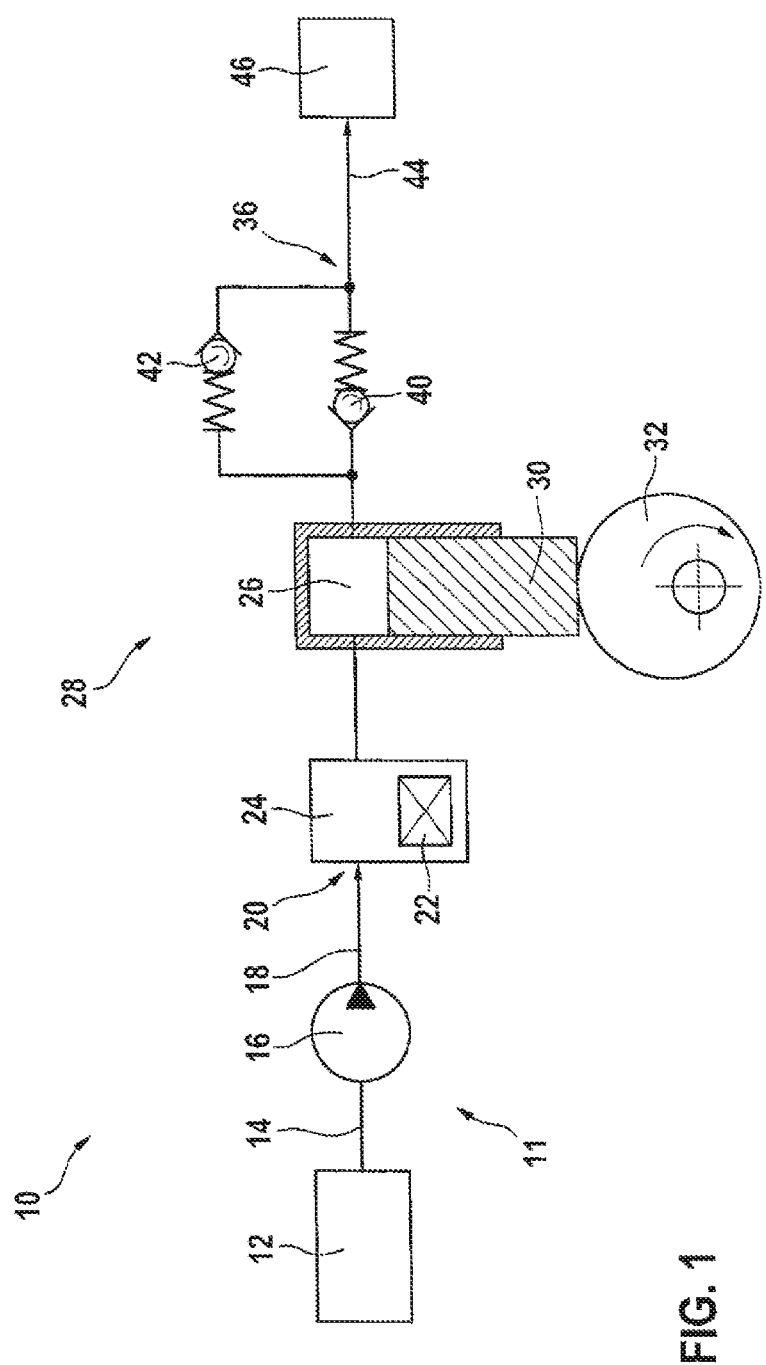
FIG. 1 shows a schematic illustration of a fuel system of an internal combustion engine with a detail of a piston pump according to the disclosure.

FIG. 1 shows a fuel system 10 for an internal combustion engine (not illustrated further) in a simplified schematic illustration. Fuel is fed from a fuel tank 12 via a suction line 14 by means of a pre-feed pump 16 via a low-pressure line 18 to the inlet 20 of a quantity control valve 24, which can be activated by an electromagnetic activation device 22, to a working space 26 of a fuel high-pressure pump 28, for example with an admission pressure of 6 bar. For example, the quantity control valve 24 can be an inlet valve, which can be opened positively, of the fuel high-pressure pump 28.

Alternatively, the quantity control valve 24 can also be embodied in such a way that it is opened when the electromagnetic activation device 22 is not energized.

The fuel high-pressure pump 28 is embodied here as a piston pump, wherein a piston 30 can be moved vertically in the drawing by means of a cam disk 32. An outlet valve 40, which is illustrated as a spring-loaded non-return valve, and a pressure-limiting valve 42, which is also illustrated as a spring-loaded non-return valve, are arranged hydraulically between the working space 26 and an outlet 36 of the fuel high-pressure pump 28. The outlet 36 is connected to a high-pressure accumulator 46 ("common rail") via a high-pressure line 44.

During the operation of the fuel system 10, the pre-feed pump 16 feeds fuel from the fuel tank 12 into the low-pressure line 18. The quantity control valve 24 can be closed and opened as a function of a respective demand of fuel. As a result, the quantity of fuel which is fed to the high-pressure accumulator 46 is influenced. As a result of the discontinuous method of working of the fuel high-pressure pump 28, what are referred to as pressure pulsations occur at a plurality of sections of the fuel system 10, in particular also upstream of the working space 26, that is to say in a low-pressure region 11 of the fuel high-pressure pump 28 or of the fuel system 10.

Figure 2:
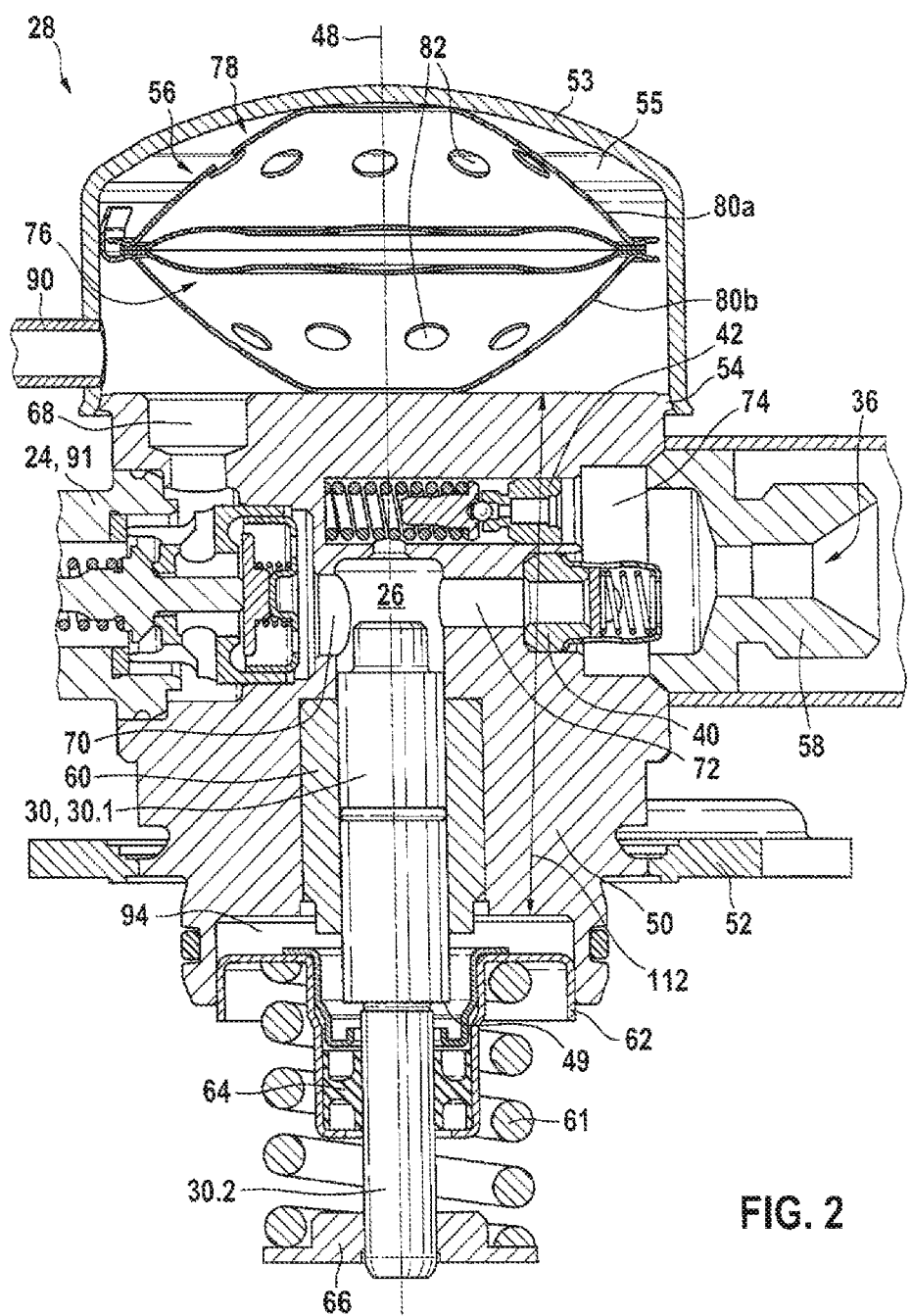
FIG. 2 shows an enlarged sectional illustration of the detail of the piston pump according to FIG. 1, FIGS. 3 to 10 show different views of the diaphragm cell according to the disclosure.

FIG. 2 shows the fuel high-pressure pump 28 of FIG. 1 in an axial sectional illustration. The fuel high-pressure pump 28 is at least partially embodied in a rotationally symmetrical fashion around a longitudinal axis 48.

The fuel high-pressure pump 28 comprises a housing 50 which can be screwed onto an engine block (not illustrated) of the internal combustion engine by means of a flange 52. In an upper region in FIG. 2, the fuel high-pressure pump 28 comprises a housing cover 53, which is arranged in a fluidically sealed fashion at an upper housing shoulder 54 of the housing 50. In a fluid space 55 which is bounded by the housing cover 53, a hydraulic damping device 56 is arranged, which will be described in more detail below.

The quantity control valve 24 is arranged on the housing 50 in a left-hand region in FIG. 2, and in a right-hand region an outlet connector 58 for connecting the high-pressure line 44 (see FIG. 1) is arranged on said housing 50. In particular, in a central and lower region in FIG. 2, inter alia the following further elements of the fuel high-pressure pump 28 are illustrated: the pressure-limiting valve 42, the outlet valve 40, the piston 30, the working space 26, the liner 60, in which the piston 30 can be moved parallel to the longitudinal axis 48, the spring receptacle 62, which is embodied in an approximate pot shape, for accommodating a piston seal 64 which radially outwardly surrounds a section of the piston 30 which is at the bottom in FIG. 2, the piston spring 61 which is embodied as a helical spring, and the spring plate 66 which is pressed onto an end section of the piston 30. Furthermore, a plurality of hydraulic ducts 68, 70, 72 and can be seen on the housing 50 in the illustrated sectional view.

There is provision that the piston 30 is embodied as a stepped piston, with a region 30.1 which faces the working space 26 and has a relatively large diameter, and a region 30.2 which is remote from the working space and has a relatively small diameter, wherein these two regions 30.1, 30.2 are connected to one another via an annular step 49.

In addition, an equalization space 94 which is fluidically separated from the working space 26 is provided between the housing 50 and the spring receptacle 62 which is embodied in a pot shape, said equalization space 94 being also bounded by the piston 30. The annular step 49 of the piston 30 is arranged in the equalization space 94. This results in the volume of the equalization space 94 becoming smaller during a suction phase of the piston pump (when the piston moves downward in FIG. 2) and the volume of the equalization space 94 becoming larger during a delivery phase of the piston pump (when the piston 30 moves upward in FIG. 2).

There is provision that the equalization space 94 and the fluid space 55 which is formed in the housing cover 53 are connected via a borehole 112, extending in the axial direction through the housing 50 and lying outside the sectional plane shown in FIG. 2. The borehole 112 is merely indicated in a purely symbolic fashion in FIG. 2 as a double arrow.

The effect of this connection is that fuel which is expelled from the working space 94 during the suction phase of the piston pump can be fed to the working space 26 via the borehole 112, extending in the axial direction, through the fluid space 55 and through the opened quantity control valve 24, which is beneficial for efficient filling of the working space 26. A pressure pulsation which occurs in the process can be efficiently reduced by the damping device 56.

The damping device 56 comprises a diaphragm cell 76 which is secured or clamped between the housing cover 53 and the housing shoulder 54 by means of a pretensioning device 78. The pretensioning device 78 comprises a first spring device 80a which is supported by its upper end in the figure on the housing cover 53, and a second spring device 80b, which is supported by its lower end in the figure on the housing shoulder 54. The diaphragm cell 76 is secured in its radial edge regions between the first and the second spring devices 80a and 80b. An inflow connection 90, which can be connected to the low-pressure line 18 (FIG. 1), is provided laterally on the housing cover 53, that is to say axially or radially toward the outside.

The first and the second spring devices 80a and 80b are embodied in the same way here. In this context, the two spring devices 80a and 80b are each embodied as a disk spring and at least approximately in the manner of a conical or spherical cap. The spring devices 80a and 80b each have a multiplicity of openings 82 which are arranged radially symmetrically with respect to one another and hydraulically connect a respective side of the spring device 80a or 80b to the respective opposite side of the spring device 80a or 80b. For example, the spring devices 80a and 80b together have twenty openings 82, permitting a hydraulic flow through the fluid space 55 formed in the housing cover 53, virtually without throttling.

Although only one diaphragm cell 76 is illustrated here, damping devices 56 or piston pumps 28 with a plurality of diaphragm cells 76, for example two or three, are always basically possible, for example one on top of the other or one next to the other, for example spaced apart from one another by the already described intermediate parts, or by means of further intermediate parts, for example spring devices.

Figure 3:
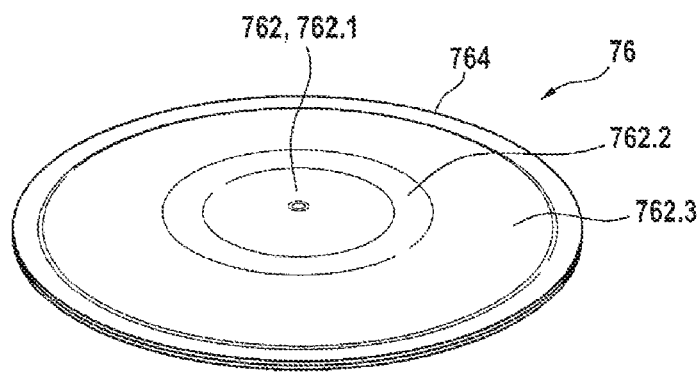
Figure 4:
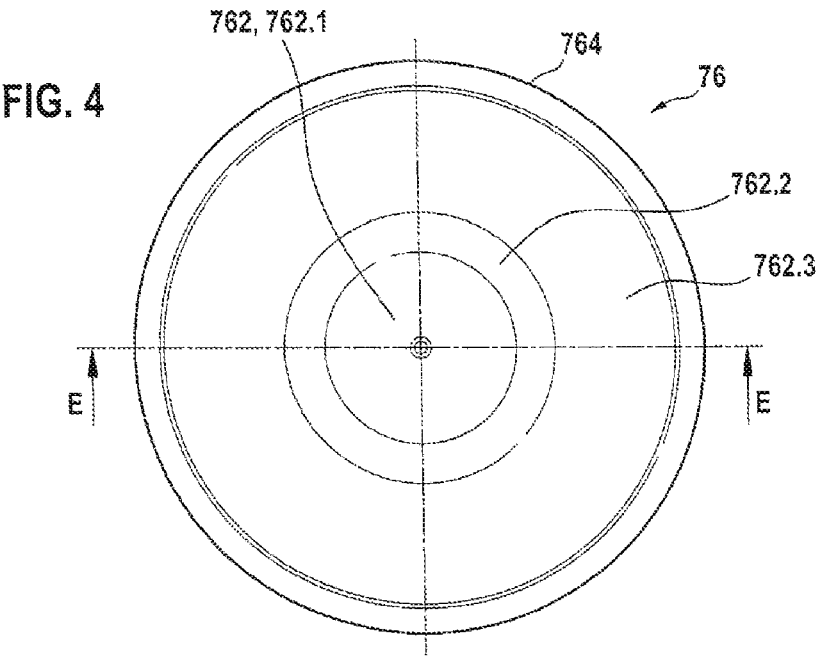
Figure 5:
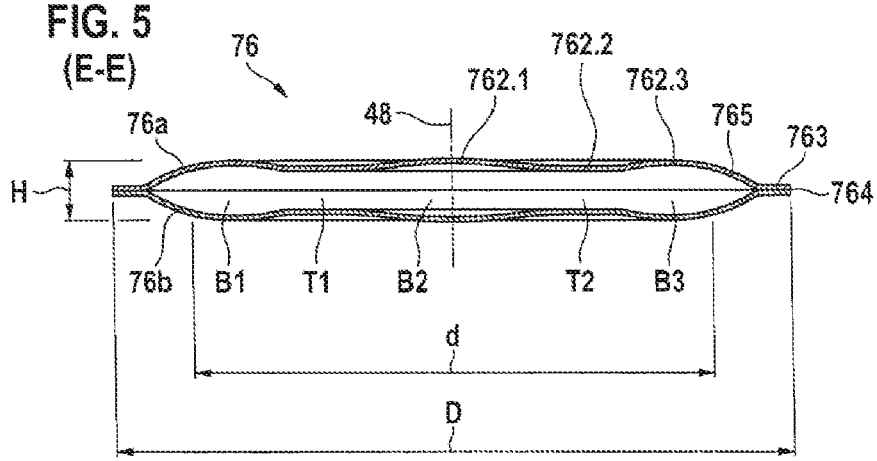
Figure 6:
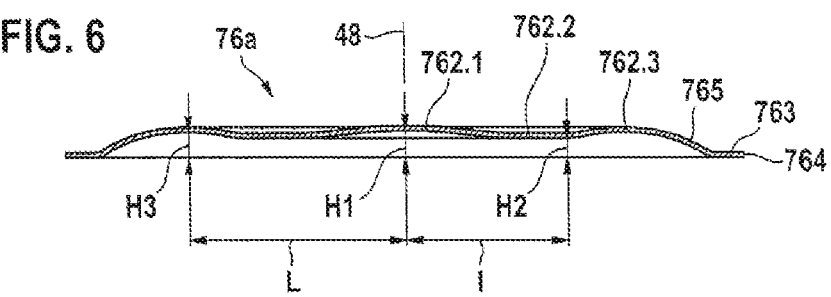
Figure 7:
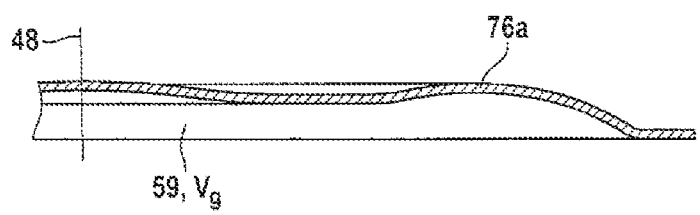

The form of the diaphragm cell 76 is illustrated in an enlarged form in FIGS. 3 to 7, wherein FIG. 3 shows a perspective view, FIG. 4 shows a top view, FIG. 5 shows a section along the line E-E in FIG. 4, FIG. 6 shows a diaphragm 76a of the diaphragm cell 76, and FIG. 7 shows a ¼ model of the same diaphragm cell 76.

A diaphragm cell 76 with a diminishing pressure difference dp, that is to say for example a diaphragm cell 76 in the low-pressure region 11 of the fuel high-pressure pump 28, is shown in FIGS. 3 to 7, wherein a pressure pi, for example helium with 6 bar at 40° C., is present in the gas space 59 of the diaphragm cell 76, said pressure being equal to the pressure pa outside the diaphragm cell 76, that is to say in the low-pressure region 11 of the fuel high-pressure pump 28.

However, it is additionally also possible to understand FIGS. 3 to 7 as meaning that they show the diaphragm cell 76 in an environment outside the fuel high-pressure pump 28, for example at an ambient pressure of 1013 mbar, after a pressure equalization has been brought about between the environment and the gas space 59, for example through a borehole (not shown) which is very small but otherwise largely free of side effects, in the diaphragm cell 76. In both cases, which are provided to provide proof of the use of the disclosure on an equal basis, the same inventive form of the diaphragm cell 76 occurs.

The diaphragm cell 76 is composed in this example of two identically shaped diaphragms 76a, 76b which are welded to one another in a gas-tight fashion at their edges 764. The diaphragms 76a, 76b each have, in FIGS. 3 to 7, a central region 762 whose diameter d extends for example over 80% of the diameter of the diaphragms 76a, 76b or of the diameter of the diaphragm cell D.

The central region 762 is composed of its radially inner region 762.1, which is shaped convexly, an annular region 762.2 which directly adjoins the latter and is shaped concavely, and a radially outer region 762.3 which is shaped convexly and directly adjoins the annular region 762.2 in the radially outer direction.

The two diaphragms 76a, 76b extend continuously toward one another in a transition region 765 directly radially outside the radially outer region 762.3 of the central region 762 and subsequently come to rest flat one on the other in a further annular region 763, in turn directly in the radially outer direction, where they are welded tightly to one another at their edges 764. This clearly results in the undulating shape of the diaphragm cell 76 in the cross section of the entire diaphragm cell 76 through the axis of symmetry 48, said shape having, in the inward-turned direction of the annular regions 763 in which the diaphragms rest one on the other, precisely three thickened portions B1, B2, B3 and in addition two thinner portions T1, T2 which are located between the thickened portions B1, B2, B3.

FIG. 6 shows further inventive dimensions of the diaphragm 76a of the diaphragm cell 76. The associated second diaphragm 76b is of identical design. It is: the diameter of the diaphragms D=45 mm; the radial distance between the maximum curvature in the radially inner region 762.1 and the maximum curvature in the radially outer region 762.3 L=15 mm; the radial distance between the maximum outward curvature in the radially inner region 762.1 and the maximum inward curvature in the annular region 762.2 l=10 mm; the height of the maximum outward curvature in the radially inner region 762.1 (half the clear height in the interior of the diaphragm cell) H1=2 mm; the height of the maximum outward curvature in the radially outer region 762.3 (half the clear height in the interior of the diaphragm cell) H3=1.8 mm; the height of the maximum inward curvature in the annular region 762.2 (half the clear height in the interior of the diaphragm cell) H2=1.5 mm. The amplitude of the wave shape of the diaphragm 76a in the inner region 762 is therefore 0.25 mm, consequently 5.5/1000 of the diameter D of the diaphragm 76a.

The maximum height H, measured on the outside of the diaphragm cell 76, of the entire diaphragm cell 76 is 4.5 mm in the example. The diaphragms 76a, 76b have a constant thickness of 0.25 mm.

Figure 8:
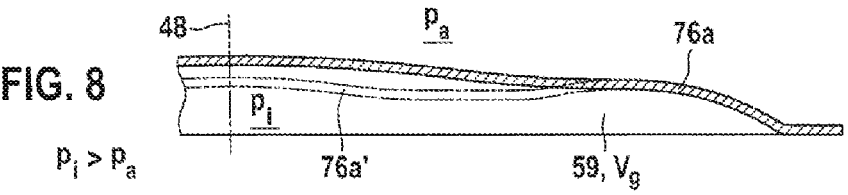

If the pressure difference dp is not zero, the diaphragm cell 76 does not have the shape shown in FIGS. 3 to 7 owing to the elastic properties of said diaphragm cell 76. An example of this is illustrated in FIG. 8, where the same diaphragm cell 76 which is shown in FIGS. 3 to 7 is shown in a ¼ model. The external pressure $p_a$ is here pa=1013 mbar, the internal pressure $p_i$ in the gas space 59 is 4.3 bar; pressure equalization has not been performed. For the purpose of comparison, the contour from FIG. 7 is contrasted once more as a non-hatched line 76a' with the contour of the diaphragm 76a which is represented in hatched form in FIG. 8. As a result of the overpressure in the interior of the gas space 59 and the elasticity of the diaphragm 76a, the latter is curved outward to an overall greater extent, in the example by 1 mm in the region of the central axis 48 of the diaphragm cell 76.

Figure 9:
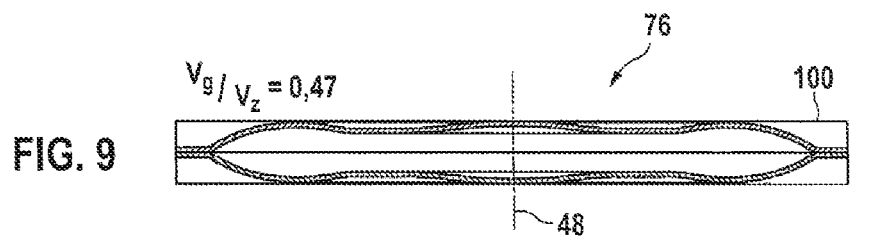

As a result of its particular shaping, in particular as a result of the flat and radially far extended central region 762, a comparatively large volume $V_g$ of the gas space 59 is available, wherein the diaphragm cell 76 takes up only a comparatively small installation space. FIG. 9 illustrates that the volume $V_g$ of the gas space 59 has, when standardized to the volume $V_z$ of the smallest straight circular cylinder 100 which can accommodate the diaphragm cell 76 completely, a value of 0.47.

Figure 10:
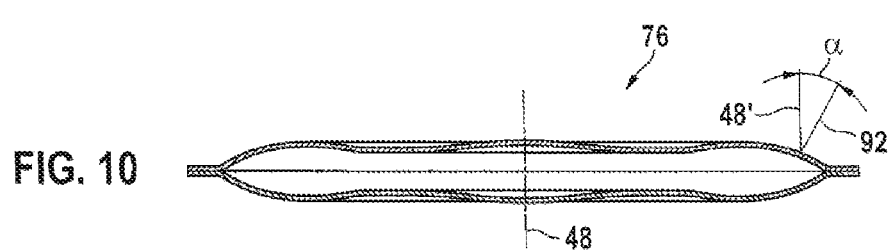

From FIG. 10 it is clear that the perpendicular line 92 with respect to the surface of the diaphragms 76a, 76b encloses everywhere an angle α of at most 40° with an axial direction 48'. In this way, visual inspection (not illustrated), which is integrated into the manufacture of the diaphragm cell 76, said inspection being, in particular, a fracture test, along the entire surface of the diaphragm cell 76 is easily and reliably possible with a camera which is fixed in relation to the diaphragm cell 76 or with visual checking from a single direction 48'.

Figure 11:
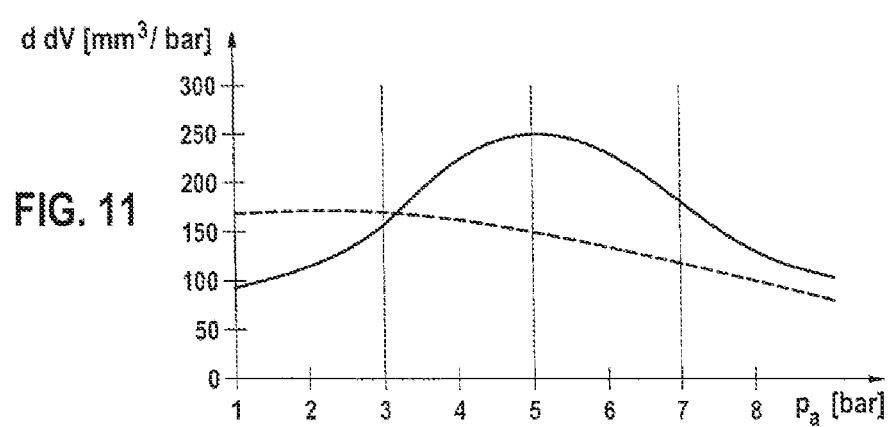
FIG. 11 shows, in a diagram, the dependence of the resilience of the diaphragm cell on the external pressure.

In FIG. 11, the unbroken line shows the resilience of the diaphragm cell 76 according to the disclosure as a function of the pressure pa outside the gas space 59. The resilience clearly assumes its maximum value of 250 mm³/bar at a pressure pa outside the gas space 59 of 5 bar. Moreover, in the entire functionally relevant interval of the pressure pa outside the gas space 59, that is to say between 3 bar and 7 bar, the resilience is at least 60% of the maximum value, that is to say at least 150 mm³/bar. For the purpose of comparison, the resilience of a diaphragm cell from the prior art is shown with the dashed line, the maximum value of which is outside the functionally relevant range.

The invention claimed is:

1. A diaphragm cell for damping pressure pulsations in a low-pressure region of a piston pump, comprising:
   two diaphragms that are connected to one another at their radial edges and enclose a gas space, wherein:
   the two diaphragms are both axially deformable in an axial direction,
   the two diaphragms each have a central region which is central in an axial top view of the diaphragm cell, and in the axial top view of the diaphragm cell the central region extends over not less than 50% of the cross-sectional area of the two diaphragms,
   the two diaphragms are shaped in an undulating fashion in the central region, the central region being curved outward in the axial direction in a radially inner region and in a radially outer region,
   an annular region which is annular in a top view (i) is arranged between the radially inner region and the radially outer region and (ii) in each case is directly adjacent to the radially inner region and the radially outer region, the annular region being curved inward in the axial direction,
   an amplitude of the wave shape measured in the axial direction is at least ⅟₁₀₀₀ and at most ²⁄₁₀₀ of the square root of 4/π times the cross-sectional area of the two diaphragms when in a pressure-equalized state in which a pressure difference is zero during operation of the piston pump,
   the pressure difference is a pressure in the gas space minus a pressure outside the gas space, in the low-pressure region of the piston pump, and
   the pressure outside the gas space varies such that an interval between the resulting pressure differences spans at least 3 bar and includes the pressure-equalized state.

2. The diaphragm cell as claimed in claim 1, wherein a distance measured in a radial direction between a maximum curvature in the radially inner region and a maximum curvature in the radially outer region is ⅕ of the square root of 4/π times the cross-sectional area of the two diaphragms.

3. The diaphragm cell as claimed in claim 1, wherein the radially inner region is curved further outward in the axial direction than the radially outer region.

4. The diaphragm cell as claimed in claim 1, wherein the radially inner region and the radially outer region are curved outward to an equal extent in the axial direction.

5. The diaphragm cell as claimed in claim 1, wherein the central region is surrounded radially by a further annular region of the two diaphragms, which is a flat portion of each diaphragm in the diaphragm cell, the flat portions are located one on top of the other and are tightly connected to one another at their radial edges.

6. The diaphragm cell as claimed in claim 5, wherein the two diaphragms are tightly welded to one another at their radial edges in the further annular region.

7. The diaphragm cell as claimed in claim 1, wherein: one or more of:
   (i) at least one of the two diaphragms, the central region, and the radially inner region has, in the axial top view, a round shape, and
   (ii) at least one of the annular region, the radially outer region, and a further annular region has, in the axial top view, a round outer contour, and
   the entire diaphragm cell is symmetrical with respect to an axis of symmetry.

8. The diaphragm cell as claimed in claim 1, wherein the gas space is filled with a gas, and wherein the gas has a pressure of 3 to 10 bar at 40° C. when the pressure difference is zero.

9. The diaphragm cell as claimed in claim 1, wherein the two diaphragms are each shaped from planar sheet-metal in a single deep-drawing step.

10. The diaphragm cell as claimed in claim 1, wherein a resilience of the diaphragm cell, which is a change in a volume of the gas space per change in the pressure difference, is greatest when the pressure difference is zero.

11. The diaphragm cell as claimed in claim 1, wherein a resilience of the diaphragm cell, which is a change in a volume of the gas space per change in the pressure difference, in the interval is at least 60% of a maximum resilience of the diaphragm cell.

12. A piston pump, comprising:
   a low-pressure region; and
   at least one diaphragm cell arranged in a low-pressure region fluidically between an inflow connection of the piston pump and an inlet valve of the piston pump, the at least one diaphragm cell including:
      two diaphragms that are connected to one another at their radial edges and enclose a gas space, wherein:
      the two diaphragms are both axially deformable in an axial direction,
      the two diaphragms each have a central region which is central in an axial top view of the diaphragm cell, and in the axial top view of the diaphragm cell the central region extends over not less than 50% of the cross-sectional area of the two diaphragms,
      the two diaphragms are shaped in an undulating fashion in the central region, the central region being curved outward in the axial direction in a radially inner region and in a radially outer region,
      an annular region which is annular in a top view (i) is arranged between the radially inner region and the radially outer region and (ii) in each case is directly adjacent to the radially inner region and the radially outer region, the annular region being curved inward in the axial direction,
      an amplitude of the wave shape measured in the axial direction is at least $1/1000$ and at most $2/100$ of the square root of $4/\pi$ times the cross-sectional area of the two diaphragms when in a pressure-equalized state in which a pressure difference is zero during operation of the piston pump,
      the pressure difference is a pressure in the gas space minus a pressure outside the gas space, in the low-pressure region of the piston pump, and
      wherein the pressure outside the gas space varies such that an interval between the resulting pressure differences spans at least 3 bar and includes the pressure-equalized state.

13. The piston pump as claimed in claim 12, wherein the diaphragm cell is secured by two securing parts at the radial edges of the two diaphragms.

14. The piston pump as claimed in claim 13, wherein the diaphragm cell is secured between a housing of the piston pump and a cover of the piston pump, the cover being welded onto the housing of the piston pump.

15. A method for operating a piston pump that includes a low-pressure region and at least one diaphragm cell arranged in the low-pressure region fluidically between an inflow connection of the piston pump and an inlet valve of the piston pump, the method comprising:
   selecting a pressure in the low-pressure region of the piston pump to be equal to a pressure in a gas space of the diaphragm cell, the diaphragm cell including:
      two diaphragms that are connected to one another at their radial edges and enclose the gas space, wherein:
      the two diaphragms are both axially deformable in an axial direction,
      the two diaphragms each have a central region which is central in an axial top view of the diaphragm cell, and in the axial top view of the diaphragm cell the central region extends over not less than 50% of the cross-sectional area of the two diaphragms,
      the two diaphragms are shaped in an undulating fashion in the central region, the central region being curved outward in the axial direction in a radially inner region and in a radially outer region,
      an annular region which is annular in a top view (i) is arranged between the radially inner region and the radially outer region and (ii) in each case is directly adjacent to the radially inner region and the radially outer region, the annular region being curved inward in the axial direction,
      an amplitude of the wave shape measured in the axial direction is at least $1/1000$ and at most $2/100$ of the square root of $4/\pi$ times the cross-sectional area of the two diaphragms when in a pressure-equalized state in which a pressure difference is zero during operation of the piston pump,
      the pressure difference is a pressure in the gas space minus a pressure outside the gas space, in the low-pressure region of the piston pump, and
      wherein the pressure outside the gas space varies such that an interval between the resulting pressure differences spans at least 3 bar and includes the pressure-equalized state.

16. The method as claimed in claim 15, wherein:
   the pressure in the low-pressure region of the piston pump is selected by providing a corresponding booster pump.

* * * * *